United States Patent [19]

Jacoby et al.

[11] 3,728,716

[45] Apr. 17, 1973

[54] DIGITAL SIGNAL DECODER USING TWO REFERENCE WAVES

[75] Inventors: George Victor Jacoby, Holden; George John Meslener, Acton, both of Mass.

[73] Assignee: RCA Corporation, New York, N.Y.

[22] Filed: July 29, 1971

[21] Appl. No.: 167,169

[52] U.S. Cl. ....................340/347 DD, 340/174.1 G, 340/174.1 H

[51] Int. Cl. ....................H04l 3/00

[58] Field of Search ....................340/347 DD, 174.1 G, 340/174.1 H; 346/74; 325/38 A; 330/1; 179/15 BC; 178/68

[56] References Cited

UNITED STATES PATENTS

| | | | |
|---|---|---|---|
| 3,452,348 | 6/1969 | Vallee | 340/347 DD |
| 3,311,442 | 3/1967 | Jager | 179/15 BC |
| 3,496,557 | 2/1970 | Lowrance | 340/174.1 G |

*Primary Examiner*—Maynard R. Wilbur
*Assistant Examiner*—Jeremiah Glassman
*Attorney*—H. Christoffersen

[57] ABSTRACT

A decoder is described for a magnetically recorded information signal in which a transition occurs at the center of a bit cell containing a "1," and a transition may occur at the boundary between two successive bit cells containing "0"s. A first synchronous demodulator is receptive to the information signal and a reference wave having a 45° phase. A second synchronous demodulator is receptive to the information signal and a reference wave having a 135° phase. Means responsive to the outputs of the demodulators generate an NRZ output signal having a "1" level when the outputs of the two demodulators have the same polarity, and having a "0" level when the outputs have different polarities.

9 Claims, 6 Drawing Figures

INVENTORS
George V. Jacoby &
George J. Meslener
BY Carl V. Olson
ATTORNEY

INVENTORS
George V. Jacoby &
George J. Meslener
BY Carl V. Olson
ATTORNEY

INVENTORS
George V. Jacoby &
George J. Meslener
BY Carl V. Olson
ATTORNEY

INVENTOR.
George V. Jacoby &
George J. Meslener
BY Carl V. Olson
ATTORNEY

INVENTOR.
George V. Jacoby &
George J. Meslener
BY Carl V. Olson
ATTORNEY

DIGITAL SIGNAL DECODER USING TWO REFERENCE WAVES

BACKGROUND OF THE INVENTION

This invention relates to digital information code converters or decoders for translating an information signal in one form especially suited for magnetic recording to another form especially suited for handling by electronic circuitry. A known form of signal for recording is a self-clocking type signal in which a transition occurs in the middle of a bit cell representing a "1" and a transition occurs between bit cells representing two successive "0"s.

The above-described signal is in a form or code which is particularly well suited for use in serial type magnetic recording and reproducing systems. This is so because the signal itself includes transitions which, when the signal is reproduced, can be extracted to produce a clocking or timing wave, and because the signal includes relatively few transitions so that information can be densely packed on the recording medium. A decoder or converter is normally used to translate the signal reproduced from the recording medium to a simple non-return-to-zero (NRZ) signal and a clock pulse wave suitable for application to the signal input and the shift input, respectively, of a conventional shift register.

A digital information signal in which a "1" is represented by a transition in the middle of a bit cell (a "0" is represented by the absence of a transition at the middle of a bit cell), and in which two successive bit cells both containing "0"s are separated by an intervening partition or clock transition, is sometimes called a delay modulation signal. This is because the decoder includes means to compare the signal with a delayed version of the signal to determine whether there was an intervening transition. The assignment of "1" and "0" meanings is purely arbitrary and may be reversed. The coding system herein called "delay modulation" is also sometimes known as "modified frequency modulation," "time modulation" or "three frequency modulation."

Decoders for translating a delay modulation signal read from a magnetic medium to an NRZ signal suitable for use by a computer processor are described in U.S. Pat. No. 3,414,894, issued on Dec. 3, 1968 to G. V. Jacoby and U.S. Pat. No. 3,452,348 issued on June 24, 1969 to J. A. Vallee. While decoders of the type described are satisfactory, a demand exists for decoders capable of responding with high accuracy to signals derived from magnetic mediums on which information is ever more densely packed, such as at a density of 4,400 bits per inch of magnetic track on a disc or drum.

SUMMARY OF THE INVENTION

The invention is based on a realization that a delay modulation digital signal can be viewed as one in which a "0" is represented by a half cycle of a wave having a 0° phase or a 180° phase, and a "1" is represented by a half cycle of a wave having a 90° phase or a 270° phase. The digital signal is synchronously demodulated at two angles, such as 45° and 135°, which are in quadrature relation with each other. The same or different polarities of the two demodulated signals are used to identify the "1" and "0" contents of successive bit cells.

DESCRIPTION OF FIGS. 1 AND 2

Figure 1:
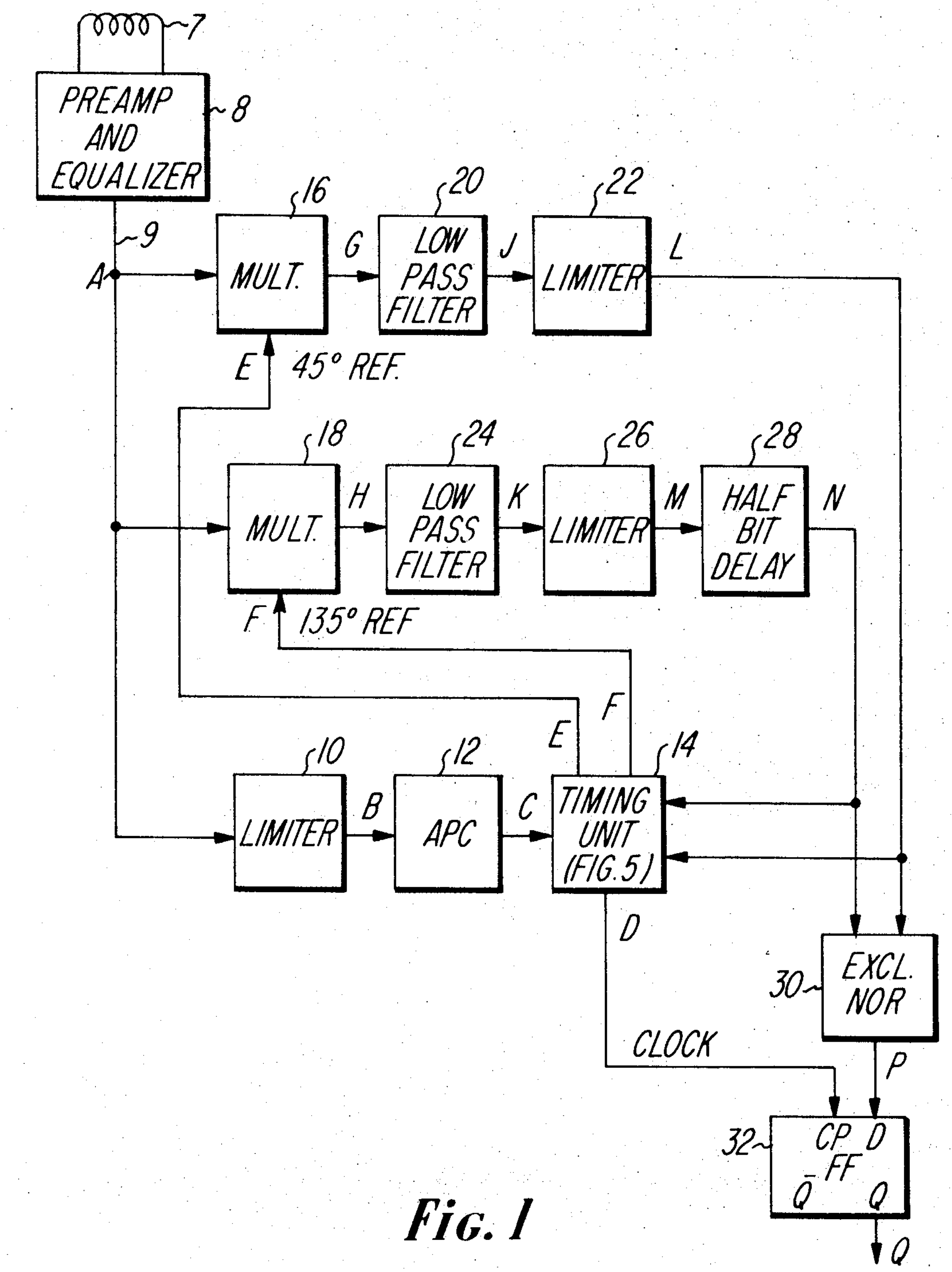
FIG. 1 is a block diagram of a decoder constructed according to the teachings of the invention.
Figure 2:
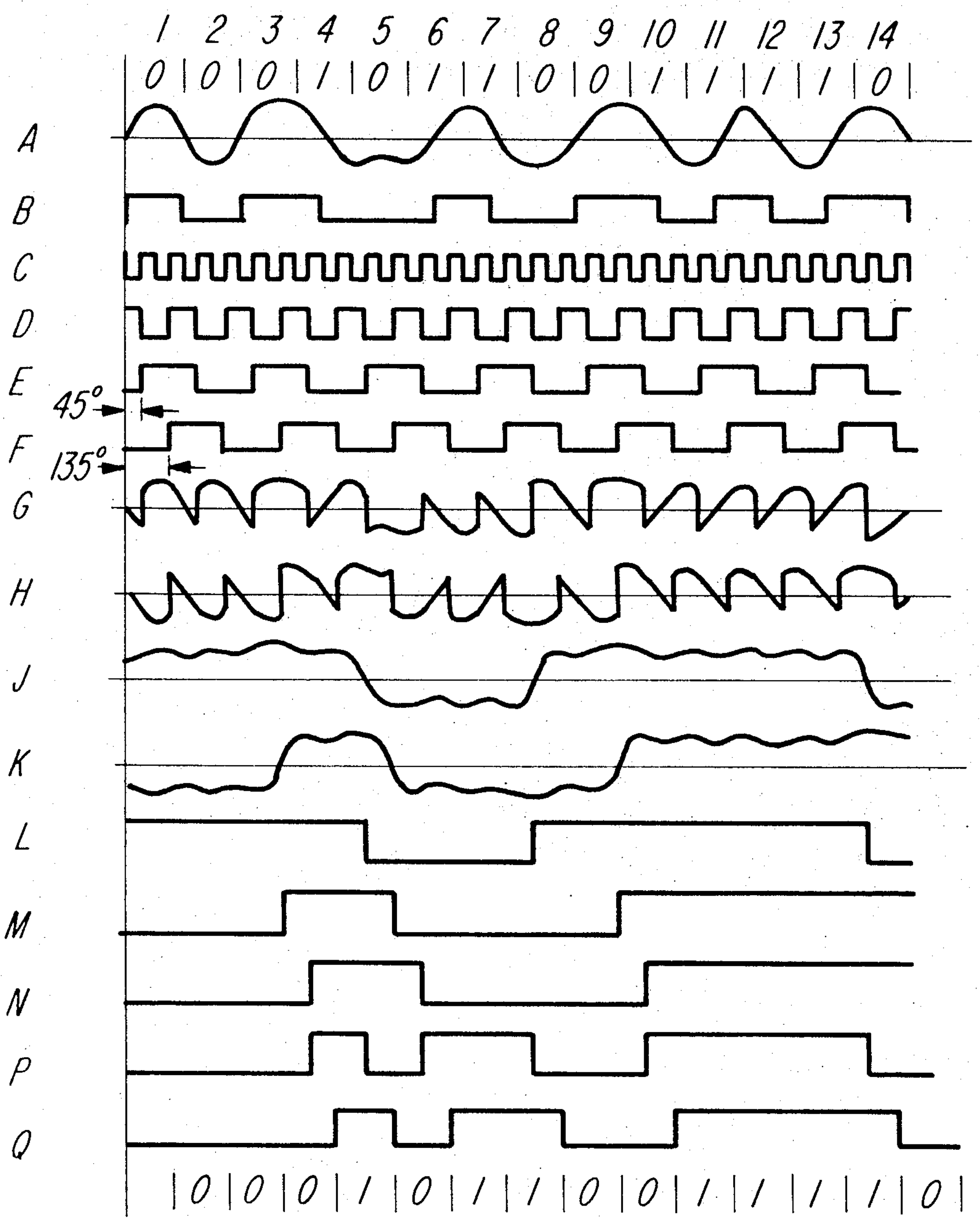
FIG. 2 is a set of voltage waveforms which will be referred to in describing the operation of the decoder of FIG. 1.

FIG. 1 is a decoder block diagram containing alphabetic characters at points in the circuit where correspondingly-lettered voltage waveforms are shown in FIG. 2. A delay modulation information signal is derived from a magnetic recording medium by a read head 7, is passed through a preamplifier and equalizer 8 from which it appears on line 9 with an exemplary wave shape A as shown in FIG. 2. The waveform is shown to be one in which a zero-crossing transition occurs at the middle of each bit cell containing a "1", and at the boundary between two successive bit cells containing "0"s. The input signal on line 9 is an equalized signal with high-frequency emphasis so that the zero-crossings of the signal waveform are accurately positioned in relation to the centers and edges of the bit cells.

For the purpose of extracting timing information, the input signal is applied to a limiter 10 which has a threshold set at ground or zero potential. The input signal is balanced with respect to ground and is a-c coupled to the limiter. The limiter 10 provides an output wave B shown in FIG. 2 in which the output voltage is high during those time periods when the input signal is positive or above the zero voltage reference line. The output of limiter 10 is applied to a conventional automatic phase control unit 12, including a phase-locked oscillator, which generates a synchronized square wave C as shown in FIG. 2, having two cycles per bit cell of the information signal. The wave C is applied to a timing unit 14 which produces a clock pulse wave D having one cycle per bit cell, a 45° delayed reference wave E having a half cycle equal to a bit cell, and a 135° delayed reference wave F also having a half cycle equal to a bit cell.

The 45° delayed reference wave E is applied to the reference signal input of a multiplier or synchronous demodulator 16, and the 135° delayed reference wave F is applied to the reference signal input of a second multiplier or synchronous demodulator 18. The input data or information signal on line 9 is applied to the data signal inputs of both of the multipliers or demodulators 16 and 18.

Each multiplier or demodulator may be a gated amplifier arranged to produce an output wave which is the product of the input data signal and the input reference signal. The product wave is formed taking into account the rules governing the multiplication of two values having the same or different signs or polarities. That is, the multiplication of two positive values or two negative values results in a positive product, and the multiplication of a positive value and a negative value results in a negative product. The multiplier 16 receives the data signal A shown in FIG. 2 and the 45° delayed reference signal E and produces an output product wave G. In a similar manner, the multiplier 18 performs the multiplication of the data signal A by the 135° delayed reference signal F to produce the product wave H.

Each multiplier or demodulator may be a Type MC–1545 "Gate-Controlled Two-Channel-Input Wide-Band Amplifier" integrated circuit made by Motorola Semiconductor Products, Inc., of Phoenix, Ariz. A balanced data signal is coupled to one signal channel input of the integrated circuit, and the balanced data signal is also coupled with reversed polarity to the other signal channel input. A 45° reference wave, or a 135° reference wave, is coupled to the gating signal input of the integrated circuit, and a product wave is produced at the output of the integrated circuit. The 45° and 135° reference waves are preferably symmetrical square waves having no even harmonics, whereby the second harmonic of the reference wave is not present to cause interfering modulation products in the output of the multiplier.

The product wave G from multiplier 16 is passed through a low-pass filter 20 to produce a filtered wave J, which is then passed through a limiter 22 to produce a limited product wave L. Similarly, the product wave H from multiplier 18 is passed through a low-pass filter 24 to produce a filtered product wave K, which is then passed through a limiter 26 to produce limited product wave M. The limited product wave M is delayed one-half of a bit cell by means of a delay unit 28 to produce a delayed limited product wave N.

According to an alternative construction, the low-pass filters 20 and 24 may be replaced by integrate-and-dump circuits. Low-Pass filters are generally more economical and satisfactory, and integrate-and-dump circuits are advantageous in a system designed to operate with magnetic recordings made at any one of a plurality of different data rates.

The 45° limited product wave L and the 135° delayed limited product wave N are applied to inputs of an exclusive "nor" gate 30. The gate 30 may be any known unit capable of providing an output P having one output level when the two input signals have the same polarity or value, and providing the other output level when the two inputs have different polarities or values.

The output P of gate 30 is applied to the signal input D of a flip-flop 32 which may be a "D"-type $T^2L$ flip-flop, such as is manufactured by several suppliers under the designation SN74H74. The flip-flop 32 has a clock input CP receptive to the wave D, shown in FIG. 2, from the timing unit 14. The flip-flop 32 is constructed so that the signal at its output terminal Q becomes the same as the input signal P at its input terminal D when the positive leading edge of the clock pulse is applied to the clock pulse terminal CP. The flip-flop 32 remains in the condition in which it is thus set until the appearance of the next following positive leading edge of the clock pulse wave D. The output Q of flip-flop 32 is thus like wave P but is delayed an amount determined by the clock pulse D. The output wave Q has an accurate timing which is independent of minor variations in the leading and trailing edges of the wave P from gate 30.

DESCRIPTION OF FIGS. 3 AND 4

Figure 3:
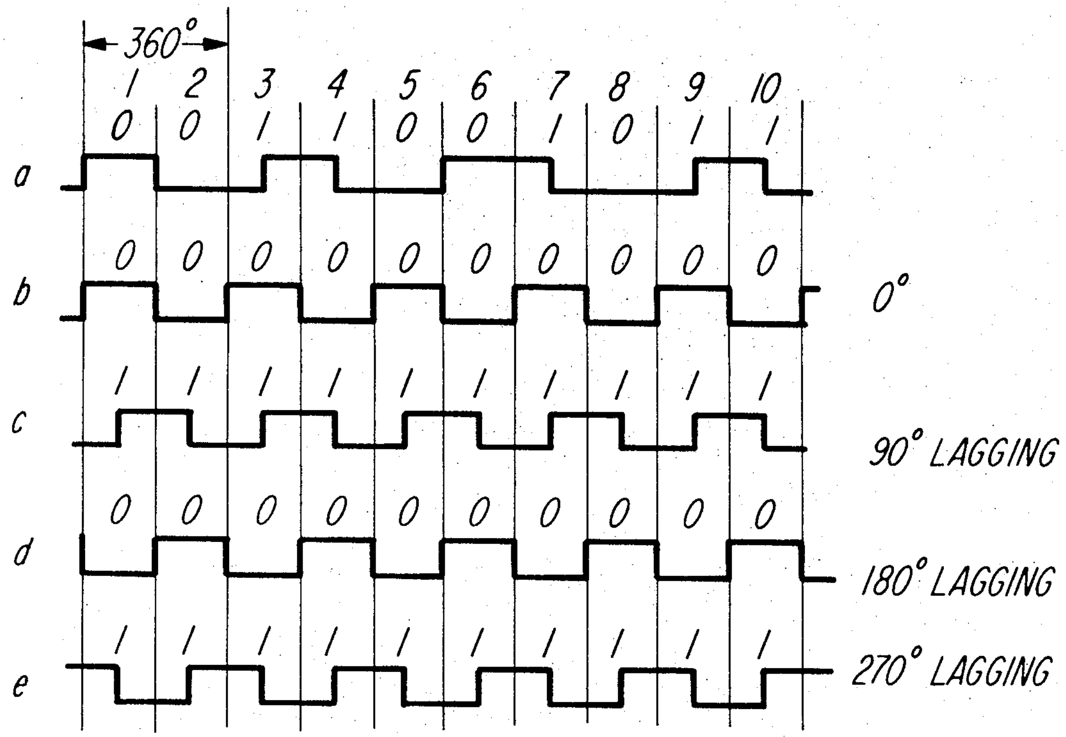
FIG. 3 is a diagram illustrating the four-phase characteristics of a delay modulation signal.

Reference is now made to FIG. 3 for a description of the characteristics of a delay modulation data signal in which transitions occur at the middle of bit cells containing "1"s and occur at the boundary between successive bit cells containing "0"s. Waveform *a* in FIG. 3 shows a delay modulation signal for an exemplary sequence of "1" and "0" information bits. Wave *b* shows a delay modulation signal when all the information bits are "0"s. It is seen that the first two bit cells in wave *b* contain "0"s and that the signal is the same as the first two bit cells in wave *a*. Therefore, the first and second bit cells of the data signal *a* each may be viewed as cells in which a "0" is represented by a half cycle of a wave *b* having a "0" phase.

Wave *c* represents a delay modulation signal representing a sequence of all "1"s. It is seen that the third and fourth information bits of data signal *a* are the same as the third and fourth bit cells of the signal *c*. Therefore, the "1"s in the third and fourth bit cells of signal *a* may be viewed as each represented by half cycles of a wave *c* having a 90° phase lag compared with wave *b*.

A continuous sequence of "0"s may appear as wave *d*, which is 180° out of phase with wave *b*. The fifth bit cell of wave *a* contains a "0" having the phase of wave *d*. Therefore, a "0" in the information signal *a* may be represented by a half cycle of a wave having either a 0° phase or a 180° phase. Similarly, wave *e* may represent a continuous string of "1"s, and it is 180° lagging in phase with respect to wave *c*. Therefore, the delay modulation signal *a* may be viewed as one in which a "1" is represented by a half cycle of a wave having a 90° lagging phase, or a 270° lagging phase. These characteristics of a delay modulation signal are utilized in accomplishing a demodulation of the signal derived from a densely packed magnetic recording with an improved degree of accuracy and reliability.

Figure 4:
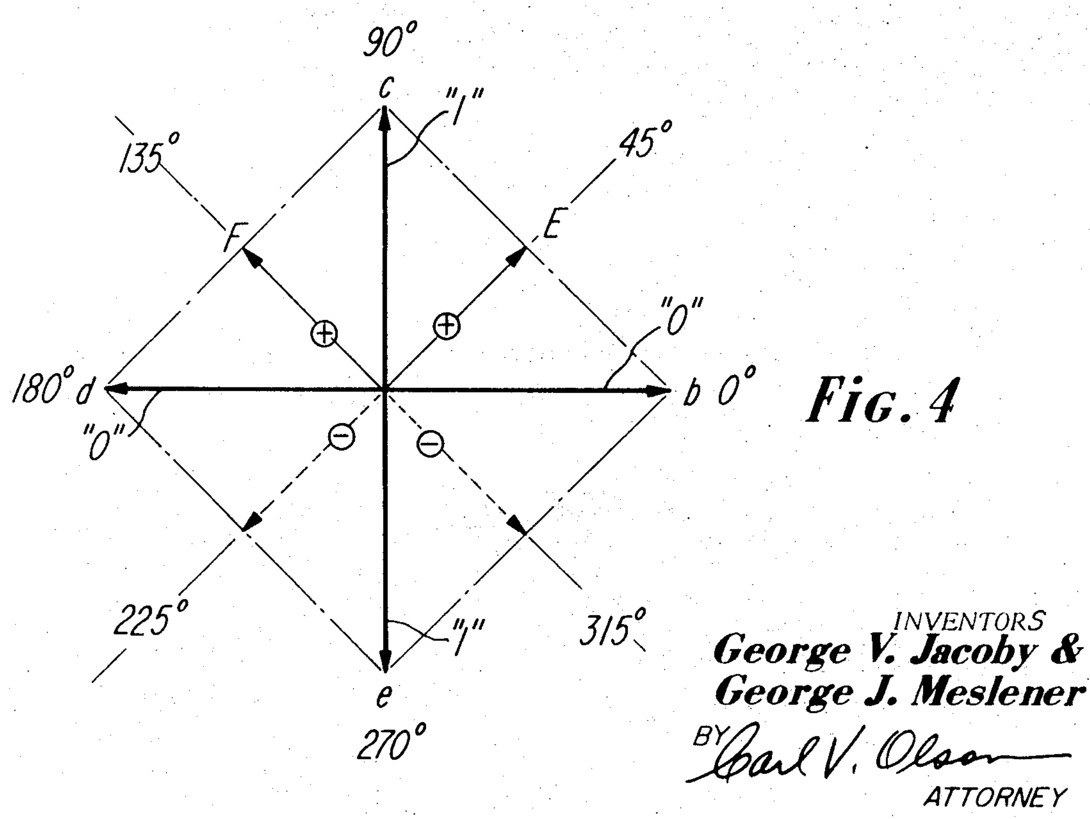
FIG. 4 is a vector diagram that will be referred to in describing the theory underlying the operation of the decoder of FIG. 1.

FIG. 4 is a vector diagram in which the arrow at 0° represents the phase of a data signal bit cell storing a "0." The arrow at 90° represents the phase of a data signal bit cell storing a "1," the arrow at 180° represents the phase of a data bit cell storing a "0" and the arrow at 270° represents the phase of a data signal bit cell storing a "1." The four recited phase angles therefore represents the phases of the waves *b* through *e* shown in FIG. 3.

The arrow at 45° represents the output from the 45° multiplier or demodulator 16 to which the 45° lagging reference wave E is applied. The arrow at 45° represents a positive output from the multiplier, and the dashed arrow at 225° represents a negative output from the multiplier. The arrows at 135° and 315° represent the positive and negative outputs from the 135° multiplier 18.

OPERATION

In the operation of the decoder of FIG. 1 in decoding or demodulating the exemplary data signal shown at A in FIG. 2 and at *a* in FIG. 3, the first information bit is a "0" and the arrow representing its phase is at 0° in FIG.

4. When the data signal has the 0° phase, the output from the 45° multiplier is positive and the output from the 135° multiplier is negative at 315°. These outputs are shown by waves L and M in FIG. 2. Since the two demodulated output signals have different polarities, the exclusive "nor" gate 30 provides a "0" output (P) representing a "0" information bit.

The second bit cell of the data signal A also contains a "0" and may be considered to have a "0" phase. The outputs from the multipliers at 45° and 315° remain of different polarities and the gate 30 continues to produce a "0" output for the second data bit cell. The same condition obtains during the third bit cell which also contains a "0."

The fourth data signal bit cell contains a "1," which means that the phase of the data signal has shifted from the 0° position to the 90° position. The outputs from the 45° and 135° multipliers or demodulators are then both positive, and being of the same polarity, they cause the gate 30 to produce a "1" output.

The fifth bit cell contains a "0," which means that the phase of the data signal has shifted to 180°, where the outputs of the multipliers are different in polarity and the gate 30 produces a "0" output. The sixth bit cell is a "1", meaning that the phase of the signal has shifted to 270° where the outputs of the two multipliers have the same negative polarities and the gate 30 produces a "1" output. It is thus seen that each change from a "0" to a "1," or from a "1" to a "0", in successive bit cells of a data signal involves a progressive 90° advance of the phase of the data signal, and that the demodulators operate at 45° and 135° to produce outputs which are compared by gate 30 to produce the correct decoded NRZ outputs for the successive bit cells.

The multipliers 16 and 18 operate at 45° and 135°, displaced 90° in phase, which means that the multiplier outputs to be compared are displaced one-half of a bit cell in time. Therefore, to bring the two multiplier outputs into time coincidence so that they can be compared in gate 30, it is desirable to delay one output by the amount of a half of a bit cell. Then a decision can be made as to whether a current bit cell contains a "1" or a "0". This half-bit-cell delay is imparted to the output of the 135° multiplier 18 by means of the delay unit 28. The undelayed output of multiplier 18 is shown at M in FIG. 2, and the half-bit-delayed output is shown at N. The polarity of the 45° demodulator output L is compared with the polarity of the 135° demodulator delayed output N in the gate 30 to produce the NRZ output signal P. The signal P is clocked in flip-flop 32 by clock pulse D at stable times in the signal P which are removed from transitions therein. This ensures that the NRZ output signal Q will have accurately timed transitions between a "0" and a "1," and between a "1" and a "0."

Figure 5:
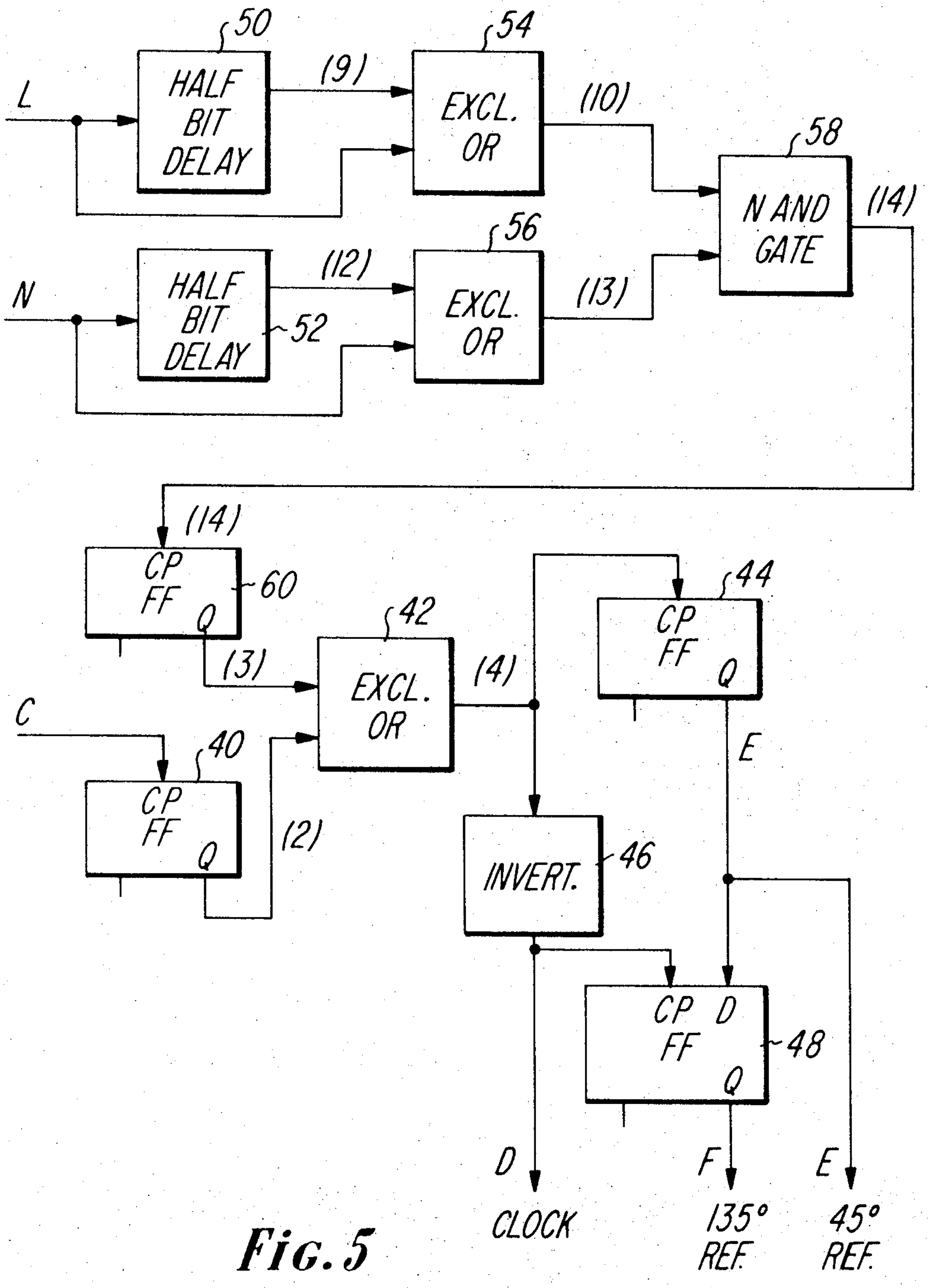
FIG. 5 is a diagram of a timing unit useful in the system of FIG. 1.
Figure 6:
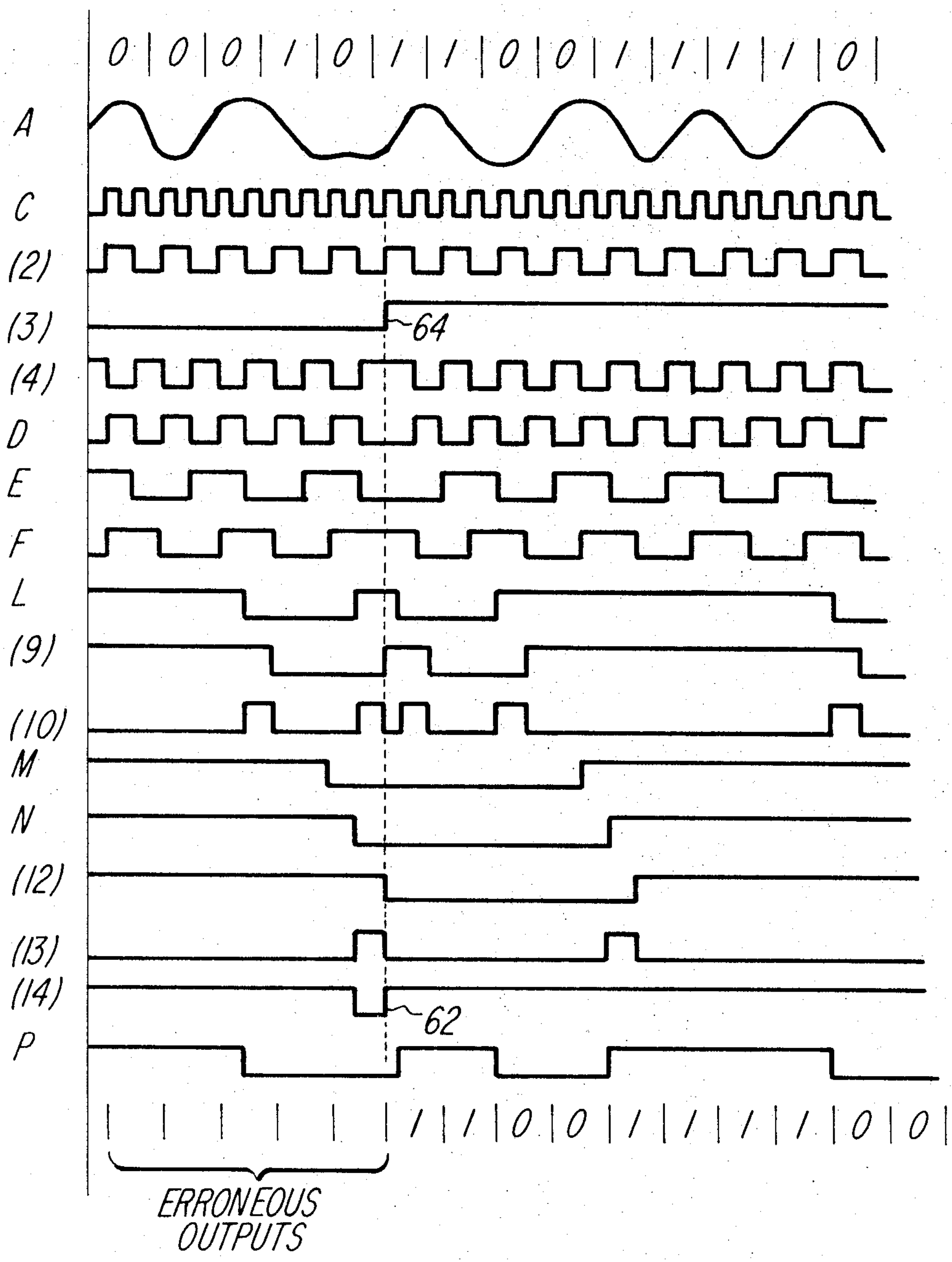
FIG. 6 is a chart of voltage waveforms which will be referred to in describing the operation of the timing unit of FIG. 5.

Reference is now made to FIGs. 5 and 6 for a more detailed description of the timing unit 14 included in the decoder of FIG. 1. The timing unit shown in FIG. 5 has a clock pulse input wave C (shown in FIGS. 2 and 6) from the automatic phase control circuit 12 in FIG. 1. The wave C is applied to the clock pulse input CP of a J-K flip-flop 40, which produces a frequency-divided wave (2), shown in FIG. 6, which is in turn applied to an input of an exclusive "or" gate 42. The gate 42 produces an output wave (4) which is either the same as input wave (2) or is the inverse (complement) of input wave (2), depending on the level of the other input wave (3) to the gate 42. The output wave (4) from gate 42 is applied to the clock pulse input CP of a J-K flip-flop 44, and is applied through an inverter 46 producing the output clock wave D. Wave D is applied to the flip-flop 32 in FIG. 1, and is also applied to the clock pulse input CP of a D-type flip-flop 48. The output of flip-flop 44 is the 45° reference wave E shown in FIGS. 2 and 6, and this wave E is applied to the input D of flip-flop 48 to produce a 90° delayed wave F which is the 135° reference wave employed in the decoder of FIG. 1.

The delay modulation signal is a self-clocking signal from which a clock wave can be extracted and used for decoding the delay modulation signal into an NRZ signal of the type employed by computers. However, the extracted timing wave may have a correct phase by which the delay modulation signal can be correctly decoded, or may have an incorrect phase which results in incorrect decoding of the delay modulation signal. This results from the fact that the extracted timing wave may have a phase determined by transitions occurring at the middle of a bit cell, or by transitions occurring at the partitions between bit cells. It is therefore customary to construct delay modulation decoders in such a way that they respond to a predetermined preamble to an information massage and automatically establish the correct phase of the timing wave for use throughout the decoding of the following information message.

The timing unit shown in FIG. 5 is constructed so that the phase of the output clock D is automatically corrected, if wrong, whenever a "101" bit sequence may occur in the delay modulation signal, whether intentionally in a preamble, or incidentally as part of the following information message. This function is accomplished by the elements shown in the upper half of FIG. 5.

A half-bit delay unit 50 receives the 45° product wave L from limiter 22 in FIG. 1, and a half-bit delay unit 52 receives the delayed 135° product wave N from delay unit 28 in FIG. 1. The output wave (9) from delay unit 50 and the undelayed product wave L are applied to an exclusive "or" gate 54 which products an output wave (10) having a positive pulse whenever the product wave L experiences a transition within the half-bit interval determined by delay unit 50. Similarly, an exclusive "or" gate 56 receives delayed and undelayed versions of wave N to produce an output wave (13) having a positive pulse whenever there is a transition in the wave N within the interval determined by delay unit 52. The output waves (10) and (13) from gates 54 and 56 are applied to a "nand" gate 58, which produces a negative output wave (14) having a negative pulse 62 whenever the inputs (10) and (13) are both positive. This negative pulse 62 occurs solely when the phase of the reference waves D, E and F are wrong, and a "101" bit sequence is encountered in the delay modulation signal being decoded. The negative pulse 62 of wave (14) is applied to the clock pulse input CP of a J-K flip-flop 60 to cause the flip-flop to change its state. When this occurs, the change 64 in the output wave (3) from flip-flop 60 conditions the exclusive "or" gate 42 to change the phase of its output wave (4) to be the same as its input wave (2), in the present example illustrated in FIG. 6. The condition thus established by the state of flip-flop 60 remains unchanged so long as the phase of the reference waves in relation to the decoded delay modulation signal remains correct.

FIG. 6 illustrates the operation of the timing unit of FIG. 5 starting with an initial condition in which the state of flip-flop 60 results in the timing or reference wave having the incorrect phase, so that the decoded NRZ output wave P is incorrect. The sequence of bits being decoded then encounters a "101" pattern in the fourth, fifth and sixth information bits illustrated. When this occurs, at a time represented by the vertical dotted line, a negative pulse 62 is generated in wave (14) which changes the state of flip-flop 60. The output wave (3) of flip-flop 60 then changes in value at 64 and subsequently maintains the value which ensures the correct decoding of all subsequent information bits of the delay modulation signal.

The following is an explanation of the underlying reasons why the timing unit of FIG. 5 detects and corrects an incorrect phase of the reference clock signal D. The limited product wave L has a transition whenever the data signal has a "01" bit sequence, and these transitions are translated by delay unit 50 and gate 54 to pulses in a pulse wave (10). The limited product wave N has a transition whenever the data signal has a "10" bit sequence, and these transitions are translated by delay unit 52 and gate 56 to pulses in a pulse wave (13). When the reference clock D has the correct phase, each pulse in wave (10) is spaced at least one bit cell from a pulse in wave (13). However, when the reference clock signal D has the wrong phase, and a "101"bit pattern is encountered, waves (10) and (13) have concurrent pulses which produce a pulse from gate 58 that changes the state of flip-flop 60, which in turn changes the phase of the reference clock wave D.

The decoder of FIG. 1 has been described in connection with the decoding of a "delay modulation" or "-modified fm" signal in which a transition occurs at the center of a bit cell containing a "1," and a transition occurs at the boundary between two successive bit cells containing "0"s. The decoder is also useful for decoding a modified delay modulation signal in which a transition occurs at some, but not all, of the boundaries between successive bit cells containing "0"s. When a "1" is followed by a string of "0"s, a transition is provided between the first and second "0"s following the "1," the transition between the second and third "0"s is omitted, and a transition is provided between the third and fourth "0"s. This type of signal, in which a transition *may* occur at the boundary between two successive bit cells containing "0"s, is described in U.S. Pat. No. 3,560,947 issued on Feb. 2, 1971, to R. C. Franchini, and is referred to as having a "modified '0' encoding". This signal is advantageously decoded using the decoder of FIG. 1.

A feature of the present invention is that the 45° and 135° reference or demodulating signals have a 360° period equal to the width of two bit cells in the data signal, or have a half cycle (180°) equal to one bit cell. The reference signals have a frequency equal to an all "1"s or all "0"s pattern in the data signal, as shown in FIG. 3. This distinguishes the invention from prior art arrangements in which the reference signals have a 360° period equal to the width of one bit cell in the data signal, and do not perform demodulation at 45° and 135° lagging phases. The present invention has the important advantage that each of the two demodulated or product waves, after limiting, vary between one or the other of only two extreme values or polarities, which are easy to distinguish in detection or comparison gates. Prior arrangements, on the other hand, have involved demodulated waves varying between three values, and have consequently suffered from closer threshold tolerances and greater uncertainty in the outputs from the detection or comparison logic units.

The decoder described involves binary signals, and the assignments herein of "1" and "0" labels to signal conditions is arbitrary and may be reversed. The decoder is described as employing 45° and 135° synchronous demodulators producing outputs having positive and negative values, and as delaying the 135° output for comparison with the 45° output. It will be understood that if different angles of demodulation are employed, account should be made of resulting changes in output polarities, output wave to be delayed and comparison logic details.

If the angles of demodulation are shifted 180° so that reference wave E is at 225° and reference wave F is at 315°, the outputs from the demodulators 16 and 18 have reversed polarities, but the exclusive "nor" gate 30 correctly decodes the "1" and "0" information. On the other hand, if a construction is employed in which the angles of demodulation are shifted 90° from the angles shown herein, so that reference wave E is at 135° or 315°, and reference wave F is at 225° or 45°, then the half bit delay unit 28 must be transferred to the output of limiter 22 to delay wave L, and the exclusive "nor" gate 30 must be replaced by an exclusive "or" gate. An "or" gate is appropriate because a "1" should be produced when the outputs of the two demodulators have different polarities, and a "0" should be produced when the outputs have the same polarities.

What is claimed is:

1. A decoder for an information signal in which a transition occurs at the center of a bit cell containing a "1," and a transition may occur at the boundary between two successive bit cells containing "0"s, whereby a "0" is represented by a half cycle of a wave having a 0° phase or a 180° phase, and a "1" is represented by a half cycle of a wave having a 90° phase or a 270° phase, comprising
   - a first synchronous demodulator receptive to said information signal and a first reference wave,
   - a second synchronous demodulator receptive to said information signal and a second reference wave,
   - said first and second reference waves having a half cycle equal in duration to a bit cell of said information signal, having a quadrature phase relation with each other, and having 45° phase displacements relative to said phases of said information signal, and
   - comparison logic means responsive to the outputs of said demodulators to generate an NRZ output signal.

2. A decoder as defined in claim 1 wherein said synchronous demodulators are each constituted by a multiplier.

3. A decoder as defined in claim 2 wherein said demodulators each include a low-pass filter following the multiplier.

4. A decoder as defined in claim 3 wherein said demodulators each include a limiter following the low-pass filter.

5. A decoder as defined in claim 1 wherein said means responsive to the outputs of the demodulators includes means to delay the output of one demodulator an amount equal to half a bit cell.

6. A decoder as defined in claim 1 and, in addition, timing means to derive said reference waves from said information signal.

7. A decoder as defined in claim 6 wherein said timing means includes means to derive a clock pulse wave from said information signal, and means responsive to the outputs of said demodulators to automatically correct the phase of the clock pulse wave if it is 180° out of the correct phase.

8. A decoder as defined in claim 1 wherein said first reference wave has a 45° phase, and said second reference wave has a 135° phase, and wherein said comparison logic means generate a "1" level when the outputs of the two demodulators have the same polarity, and generate a "0" level when the outputs have different polarities.

9. A decoder for an information signal in which a transition occurs at the center of a bit cell containing a "1," and a transition may occur at the boundary between two successive bit cells containing "0"s, whereby a "0" is represented by a half cycle of a wave having a 0° phase or a 180° phase, and a "1" is represented by a half cycle of a wave having a 90° phase or a 270° phase, comprising a 45° synchronous demodulator receptive to said information signal and a reference wave having a 45° phase, whereby the output of the demodulator is positive for a "0" bit having 0° phase and is negative for a "0" bit having a 180° phase, a 135° synchronous demodulator receptive to said information signal and a reference wave having a 135° phase, whereby the output of the demodulator is positive for a "1" bit having a 90° phase and is negative for a "1" bit having a 270° phase, and means responsive to the outputs of the demodulators to generate an NRZ output signal having a "1" level when the outputs of the two demodulators have the same polarity, and having a "0" level when the outputs have different polarities.

* * * * *